(12) United States Patent
Ma et al.

(10) Patent No.: US 7,904,961 B2
(45) Date of Patent: Mar. 8, 2011

(54) NETWORK ATTACK DETECTION USING PARTIAL DETERMINISTIC FINITE AUTOMATON PATTERN MATCHING

(75) Inventors: Qingming Ma, Sunnyvale, CA (US); Bryan Burns, Palo Alto, CA (US); Krishna Narayanaswamy, San Jose, CA (US); Vipin Rawat, Fremont, CA (US); Michael Chuong Shieh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 991 days.

(21) Appl. No.: 11/738,059

(22) Filed: Apr. 20, 2007

(65) Prior Publication Data

US 2008/0263665 A1 Oct. 23, 2008

(51) Int. Cl.
*G06F 11/00* (2006.01)
(52) U.S. Cl. .............. 726/23; 711/154; 726/22; 726/24
(58) Field of Classification Search .............. 726/22–24; 711/154
See application file for complete search history.

(56) References Cited

U.S. PATENT DOCUMENTS

| | | | |
|---|---|---|---|
| 7,260,558 B1 * | 8/2007 | Cheng et al. ............... | 706/12 |
| 7,308,446 B1 | 12/2007 | Panigrahy et al. | |
| 7,558,925 B2 * | 7/2009 | Bouchard et al. .......... | 711/154 |
| 7,685,637 B2 * | 3/2010 | Zhao et al. ................. | 726/22 |
| 2006/0085389 A1 | 4/2006 | Flanagan et al. | |
| 2006/0101195 A1 * | 5/2006 | Jain ............................ | 711/104 |
| 2006/0120137 A1 | 6/2006 | Gould et al. | |
| 2006/0242123 A1 | 10/2006 | Williams | |
| 2008/0140661 A1 | 6/2008 | Pandya | |

FOREIGN PATENT DOCUMENTS

| | | |
|---|---|---|
| WO | WO 03/023553 A2 | 3/2003 |
| WO | WO 2006/031659 A2 | 3/2006 |

OTHER PUBLICATIONS

Gonzalo Navarro, "A Partial Deterministic Automaton for Approximate String Matching", In Proc. 4th South American Workshop on String Processing (WSP'97), pp. 112-127, 1997.*

Baker et al., "Automatic Synthesis of Efficient Intrusion Detection Systems on FPGAs," *IEEE Transactions on Dependable and Secure Computing*, vol. 3, No. 4, Oct.-Dec. 2006, pp. 289-300.

(Continued)

*Primary Examiner* — Brandon S Hoffman
*Assistant Examiner* — Hee Song
(74) *Attorney, Agent, or Firm* — Shumaker & Sieffert, P.A.

(57) ABSTRACT

This disclosure describes techniques for determining whether network traffic contains one or more computer security threats. In order to determine whether a symbol stream conforms to the symbol pattern, a security device stores a full deterministic finite automaton (fDFA) that accepts streams of symbols that conform to the symbol pattern. The security device also creates a partial deterministic finite automaton (pDFA) that includes nodes that correspond to the nodes in the fDFA that have the highest visitation levels. The security device processes each symbol in the symbol stream using the pDFA until a symbol causes the pDFA to transition to a failure node or to an accepting node. If the symbol causes the pDFA to transition to the failure node, the security device processes the symbol and subsequent symbols in the symbol stream using the fDFA.

28 Claims, 8 Drawing Sheets

OTHER PUBLICATIONS

Sourdis et al., "Fast, Large-Scale String Match for a 10Gbps FPGA-Based Network Intrusion Detection System," 13th International Conference onField-Programmable Logic and Applications, *FPL 2003 proceedings*, (lecture notes in Computer Science vol. 2778), pp. 880-889, Sep. 2003.

Dharmapurikar et al., "Fast and Scalable Pattern Matching for Content Filtering," Symposium on Architecture for Networking and Communications Systems, *ANCS 2005*, Oct. 26, 2005, pp. 183-192.

Hutchings et al., "Assisting Network Intrusion Detection with Reconfigurable Hardware," *Proceedings of the 10th Annual IEEE Symposium on Field-Programmable Custom Computing Machines*, Apr. 22-24, 2002, pp. 111-120.

Stoyanov et al., "Resolving Non-Determinism in NFA," International Conference on Computer Systems and Technologies, Jul. 9, 2003, 5 pgs.

Sutton, "Partial Character Decoding for Improved Regular Expression Matching in FPGAs," Proceedings of the 2004 IEEE International Conference on Field-Programmable Technology, Dec. 6-8, 2004, pp. 25-32.

University of Alaska, "Finite Automata," Aug. 20, 2005, 48 pgs., http://www.math.uaa.alaska.edu/-afkjm/cs351/handouts/finite-automata.ppt.

European Search Report from European Application No. 07253056.1, dated Sep. 3, 2009, 3 pgs.

U.S. Appl. No. 12/361,364, filed Jan. 28, 2009, entitled, "Efficient Application Identification With Network Devices," Ma et al.

Xiaofei, Wang et al., "Extraction of fingerprint from regular expression for efficient prefiltering", ICCTA '09, IEEE International Conference on Communications Technology and Applications, 2009, IEEE, Piscataway, NJ, USA, Oct. 16, 2009, pp. 221-226.

European Search Report dated Sep. 8, 2008 for corresponding European Application No. 07 25 3272, 2 pgs.

Z. Shan et al., "A Network State Based Intrusion Detection Model," Proceedings of the 2001 International Conference on Computer Networks and Mobile Computing (ICCNMC'01), Oct. 16, 2001, pp. 481-486.

U.S. Appl. No. 11/739,365, filed Apr. 24, 2007, entitled, "Parallelized Pattern Matching Using Non-Deterministic Finite Automata," Goldman et al.

* cited by examiner

NETWORK ATTACK DETECTION USING PARTIAL DETERMINISTIC FINITE AUTOMATON PATTERN MATCHING

TECHNICAL FIELD

The invention relates to computer networks and, more particularly, to network security.

BACKGROUND

An enterprise computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the enterprise network to different security vulnerabilities.

Conventional techniques for detecting network attacks use pattern matching. For example, an enterprise may deploy one or more security devices that inspect network traffic for viruses or other security threats. The security device typically applies regular expressions or sub-string matches to the network traffic to detect defined patterns within a protocol stream. Multiple patterns may be used in an attempt to detect different types of attacks and generally improve the accuracy and robustness of the attack detection.

SUMMARY

This disclosure describes techniques for determining whether network traffic contains one or more computer security threats. As described herein, a security device (e.g., a intrusion detection and prevention device, firewall, or other network device) may use the techniques to determine whether a symbol stream conforms to a symbol pattern associated with a computer security threat. To determine whether the symbol stream conforms to the symbol pattern, the security device stores a full deterministic finite automaton (fDFA) that accepts streams of symbols that conform to the symbol pattern. The security device also creates a partial deterministic finite automaton (pDFA) that includes nodes that correspond to the nodes in the fDFA that have the highest visitation levels. The security device processes each symbol in the symbol stream using the pDFA until a symbol causes the pDFA to transition to a failure node or to an accepting node. If the symbol causes the pDFA to transition to the failure node, the security device processes the symbol and subsequent symbols in the symbol stream using the fDFA.

In one embodiment, a method comprises storing a set of full deterministic finite automaton (fDFA) nodes. The fDFA nodes represent a full deterministic finite automaton fDFA. The first fDFA accepts symbol streams that conform to a first symbol pattern. The method also comprises creating a set of pDFA nodes. Each of the pDFA nodes has a corresponding node in the fDFA nodes that has a visitation level that exceeds a visitation threshold. Each node in the pDFA nodes specifies a transition for a symbol to a node in the pDFA nodes when the corresponding node in the fDFA nodes specifies a transition for the symbol to a node in the fDFA nodes that has a visitation level that exceeds the visitation threshold. Each node in the pDFA nodes specifies a transition for a symbol to a failure node in the pDFA nodes when the corresponding node in the fDFA nodes specifies a transition for the symbol to a node in the fDFA nodes that has a visitation level that does not exceed the visitation threshold. In addition, the method comprises receiving a symbol in a symbol stream. The method also comprises determining whether a current node of the pDFA nodes is a failure node. Furthermore, the method comprises determining, when the current node of the pDFA nodes is not the failure node, whether the current node of the pDFA nodes specifies a transition for the symbol to the failure node. Furthermore, the method comprises identifying, when the current node of the pDFA nodes specifies a transition for the symbol to the failure node, a node in the fDFA nodes that corresponds to the current node of the pDFA nodes as a current node of the fDFA nodes. The method also comprises detect computer security threat when the current node of the pDFA nodes is the failure node and when the current node of the fDFA nodes specifies a transition for the symbol to an accepting node.

In another embodiment, an intermediate network device comprises a memory module that stores a set of full deterministic finite automaton (fDFA) nodes. The fDFA nodes represent a full deterministic finite automaton (fDFA) that accepts strings of symbols that conform to a symbol pattern. The intermediate network device also comprises a pDFA update module that creates a set of pDFA nodes. The pDFA nodes represent a partial deterministic finite automaton (pDFA). Each of the pDFA nodes has a corresponding node in the fDFA nodes that has a visitation level that exceeds a visitation threshold. Each node in the pDFA nodes specifies a transition for a symbol to a node in the pDFA nodes when the corresponding node in the fDFA nodes specifies a transition for the symbol to a node in the fDFA nodes that has a visitation level that exceeds the visitation threshold. Each node in the pDFA nodes specifies a transition for a symbol to a failure node in the pDFA nodes when the corresponding node in the fDFA nodes specifies a transition for the symbol to a node in the fDFA nodes that has a visitation level that does not exceed the visitation threshold. In addition, the intermediate network device comprises a DFA engine that receives a symbol in a symbol stream; determines whether a current node of the pDFA nodes is a failure node; determines, when the current node of the pDFA nodes is not the failure node, whether the current node of the pDFA nodes specifies a transition for the symbol to the failure node; identifies, when the current node of the pDFA nodes specifies a transition for the symbol to the failure node, a node in the fDFA nodes that corresponds to the current node of the pDFA nodes as a current node of the fDFA nodes; and detect a computer security threat when the current node of the pDFA nodes is the failure node and when the current node of the fDFA nodes specifies a transition for the symbol to an accepting node.

In another embodiment, a computer-readable medium comprises instructions. When executed, the instructions cause a processor to store a set of full deterministic finite automaton (fDFA) nodes. The fDFA nodes represent a full deterministic finite automaton fDFA. The fDFA accepts symbol streams that conform to a symbol pattern. The instructions also cause the processor to create a set of pDFA nodes. The pDFA nodes represent a partial deterministic finite automaton (pDFA). Each of the pDFA nodes has a corresponding node in the fDFA nodes that has a visitation level that exceeds a visitation threshold. Each node in the pDFA nodes specifies a transition for a symbol to a node in the pDFA nodes when the corresponding node in the fDFA nodes specifies a transition for the symbol to a node in the fDFA nodes that has a visitation level that exceeds the visitation threshold. Each node in the pDFA nodes specifies a transition for a symbol to a failure node in the pDFA nodes when the corresponding node in the fDFA nodes specifies a transition for the symbol to a node in the fDFA nodes that has a visitation level that does not exceed the visitation threshold. The instructions also cause the processor to receive a symbol in a symbol stream. In addition, the instructions cause the processor to determine whether a current node of the pDFA nodes is a failure node. The instructions also cause the processor to determine, when the current node of the pDFA nodes is not the failure node, whether the current node of the pDFA nodes specifies a transition for the symbol to the failure node. In addition, the instructions cause the programmable processor to identify, when the current node of the pDFA nodes specifies a transition for the symbol to the failure node, a node in the fDFA nodes that corresponds to the current node of the pDFA nodes as a current node of the fDFA nodes. The instructions also cause the processor to detect a computer security threat when the current node of the pDFA nodes is the failure node and when the current node of the fDFA nodes specifies a transition for the symbol to an accepting node.

In another embodiment, a method comprises storing a set of full deterministic finite automaton (fDFA) nodes, wherein the fDFA nodes represent a full deterministic finite automaton fDFA that accepts symbol streams that conform to a symbol pattern. The method also comprises creating a set of pDFA nodes, wherein the pDFA nodes represent a partial deterministic finite automaton (pDFA). Each of the pDFA nodes has a corresponding node in the fDFA nodes that has a visitation level that exceeds a visitation threshold. Each node in the pDFA nodes specifies a transition for a symbol to a failure node in the pDFA nodes when the corresponding node in the fDFA nodes specifies a transition for the symbol to a node in the fDFA nodes that has a visitation level that does not exceed the visitation threshold. The method also comprises receiving a symbol in a symbol stream. In addition, the method comprises detecting a computer security threat using the pDFA nodes and the fDFA nodes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
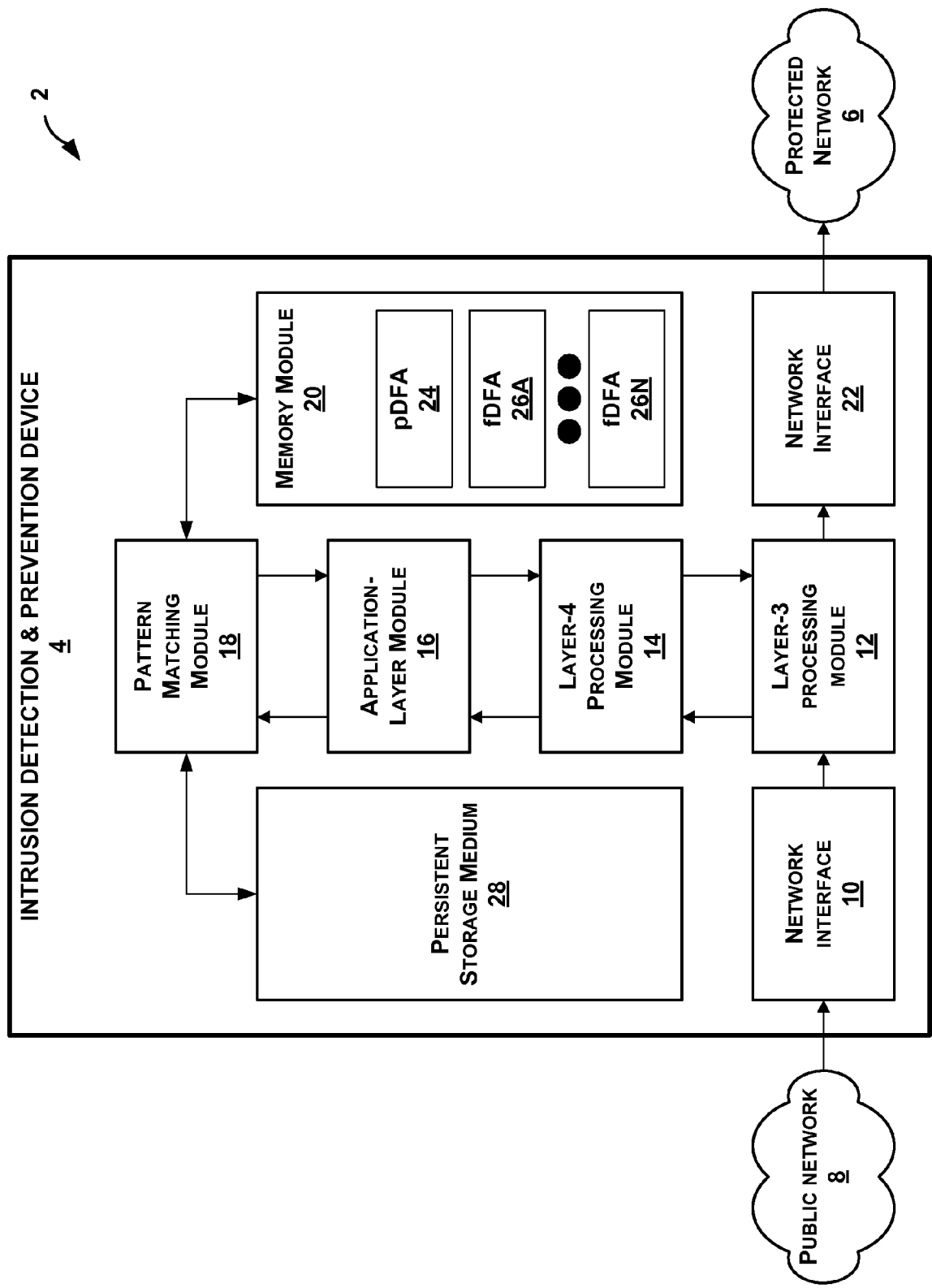
FIG. 1 is a block diagram illustrating an exemplary system in which an intrusion detection and prevention device operates to protect a private network.

FIG. 1 is a block diagram illustrating an exemplary system 2 that includes an Intrusion Detection and Prevention (IDP) device 4, a protected network 6, and a public network 8. Public network 8 may comprise an unsecured wide-area network, such as the Internet, a wireless network, a local-area network, or another type of computer network. Protected network 6 may comprise a secured computer network such as a local-area network in an office or a network data center.

In system 2, IDP device 4 is connected to public network 8 and protected network 6 such that network traffic flowing from public network 8 to protected network 6 flows first to IDP device 4. IDP device 4 comprise be a stand-alone network appliance, a component of another network appliance (e.g., a firewall appliance), a software module that executes on a network appliance, or another configuration. In general, IDP device 4 inspects network traffic from public network 8 and determines whether the network traffic includes any computer security threats. A computer security threat is an attempt to gain access to sensitive information, an attempt to disrupt the operation of an organization, or another type of attack. Example computer security threats include computer viruses, spyware, rootkits, attempts to guess passwords, phishing emails, requests associated with a denial of service attack, and other types of attack.

A computer security threat may be associated with one or more symbol patterns that identify the computer security threat, but do not identify innocuous data. A symbol pattern associated with a computer security threat is referred to herein as a "threat signature." For example, a particular virus may always include a sequence of instructions that, when executed, perform a malicious operation.

If IDP device 4 determines that a given stream of network traffic does not include any computer security threats, IPD device 4 may communicate the stream of network traffic to protected network 6. Otherwise, if IDP device 4 determines that the stream includes one or more computer security threats, IDP device 4 may drop the network traffic, log the network traffic, forward the traffic to a traffic analyzer for further analysis, and/or perform some other action with regard to the network traffic. In this way, IDP device 4 may prevent network traffic that includes computer security threats from reaching protected network 6.

As illustrated in the example of FIG. 1, IDP device 4 may contain a plurality of components. This disclosure illustrates these components only for purposes of explanation. In some cases, IDP device 4 may include fewer than the components illustrated in FIG. 1, and in other cases, IDP device 4 may include more than the components illustrated in FIG. 1. Moreover, the functionality of these components as described herein may be distributed among separate components or devices.

When network traffic from public network 8 arrives at IDP device 4, a first network interface 10 may process the physical signals from public network 8 and output link layer frames to a network layer module 12. In a packet-based network, network layer module 12 typically processes the link layer frames in order to produce flows of network packets. For example, network layer module 12 may assemble and output a flow of Internet Protocol (IP) packets based on the link layer frames. IP packets are generally considered part of the same packet flow when the IP packets share a common source address, destination address, source port, destination port, and protocol, although more or less granular flows may be considered.

A transport layer module 14 may use each of these flows of network packets to produce streams of transport layer segments. For example, transport layer module 16 may produce a stream of Transmission Control Protocol (TCP) segments for each flow of network packets. These transport layer segments may be used, in turn, by an application layer module 16.

Application layer module 16 may assemble the TCP segments to form application-layer data and extract application layer communications from the data. Application layer module 16 may include one or more protocol-specific plug-in modules that extract application layer communications for various application layer protocols. For example, application layer module 16 may include a plug-in module that extracts Hypertext Transfer Protocol (HTTP) communications from TCP segments, a plug-in module that extracts Session Initiation Protocol (SIP) communications from TCP segments, and plug-in modules that extract communications in other application layer protocols. Other examples of application-layer communication protocols that application layer module 16 may support include the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Internet Message Access Protocol (IMAP), Server Message Block (SMB), Dynamic Host Configuration Protocol (DHCP), and other protocols.

Application layer module 16 may analyze the application layer communications and extract protocol-specific elements in the form of symbol strings. As used herein, the term "application layer elements" refers to protocol-specific symbol strings obtained at the application-layer. For example, application layer module 16 may extract protocol-specific "contexts" and "values" from the reassembled application layer communications. In general, "contexts" are named elements within a stream of application layer messages that uniquely identifies various types of application layer elements. The named elements provide an application layer basis for describing a communication session. Examples of contexts include file names, user names, application names, names of attached documents, protocol-specific header information, protocol-specific authorization data, form data, and other information that describes the communication session. As a particular example, a context for an HTTP protocol stream may include the name of a server providing the HTTP service and the name of the type of web browser (e.g., "Internet Explorer") accessing the server. By reassembling application layer communications, application layer module 16 may extract specific contexts (e.g., browser type) and corresponding values (e.g., "Internet Explorer"). Application layer module 16 may output such application layer elements as parts of the symbol streams. For example, application layer module 16 may output a symbol stream that comprises a set of symbols that represent an application layer element followed by a set of symbols that represent an application layer communication. After application layer module 16 forms the symbol streams, application layer module 16 may forward the symbol streams to a pattern matching module 18.

A memory module 20 (e.g., computer-readable storage medium such as RAM, FLASH, a disk drive, or the like) may store full deterministic finite automata (fDFAs) 26A through 26N (collectively "fDFAs 26"). Each of fDFA 26 may detect one or more threat signatures in a symbol stream. For instance, a first one of fDFAs 26 may detect a threat signature associated with a particular computer virus and a second one of fDFAs 26 may detect a threat signature associated with a rootkit.

Each of fDFAs 26 may be represented as a set of nodes. Nodes in fDFA 26 may be non-accepting nodes or accepting nodes. Each non-accepting node in one of fDFAs 26 may be a data structure that specifies zero or more transitions to other nodes in the same one of fDFAs 26 for certain symbols. fDFAs 26 may enter an accepting node only if a symbol stream conforms to a symbol pattern. In other words, a one of fDFAs 26 "accepts" a symbol stream only if the symbol stream conforms to a threat signature.

In order to specify transitions to other nodes for certain symbols, a node may include a mapping from the symbols to node indexes included in the node. A node index may be a value that indicates a memory location in memory module 20 at which the node is stored. For example, nodes in fDFA 26A may be stored in an array of memory locations in memory module 20 starting at a base address. In this example, a node index may specify an offset from this base address. For instance, a node index of '3' may indicate the third node in the array of memory locations. To illustrate how a node maps a symbol to a node index, consider the following example: a first node in fDFA 26A may map the symbol 'a' to a node index that indicates a memory location in memory module 20 at which a second node in fDFA 26A is stored.

Nodes in fDFAs 26 may map various types of symbols to node indexes. For instance, nodes in fDFAs 26 may map standard ASCII or Unicode symbols to node indexes. Nodes in fDFAs 26 may also map meta-symbols to node indexes. A meta-symbol represents a particular class of symbols. For example, a meta-symbol may represent all uppercase letters. Other example meta-symbols may include meta-symbols that represent all lowercase letters, all alphanumeric symbols, all alphabetical symbols, all numeric symbols, all symbols, all whitespace symbols, all symbols within a particular range of symbols, case-insensitive matching, any symbol other than a given symbol, and other classes of symbols. The use of meta symbols may reduce the number of mappings within each node because a node that includes a mapping from a meta-symbol that represents a class of symbols to a single node index corresponds to a node that include a mapping from each symbol included in the class of symbols to separate copies of the same node index.

Each node in fDFAs 26 may be formatted according to a bitmap encoding scheme. In this bitmap encoding scheme, symbols and meta-symbols in a symbol set are associated with individual bits in a bitmap that is included in a node in fDFAs 26. In one example encoding scheme, if a bit in the bitmap is set to '1', the node maps a symbol associated with the bit to a node index that is included in the node. In this example encoding scheme, if the bit in the bitmap is set to '0', the node does not map the symbol associated with the bit to a node index in the node. Rather, if a bit in a bitmap in a node in one of fDFAs 26 is associated with a symbol and the bit is set to '0', there may be an implied transition for the symbol from the node to a start node of the one of fDFAs 26. Because nodes in fDFAs 26 typically specify a considerable number of transitions to start nodes of fDFAs 26, not including node indexes that indicate the start node may result in a lower overall size of nodes in fDFAs 26. This disclosure presents details of an example bitmap encoding scheme in relation to FIG. 8 below.

Each of fDFAs 26 may include a large number of nodes. Because each of fDFAs 26 may include a large number of nodes, it might not be possible to store all of the nodes in one of fDFAs 26 within a single memory page in memory module 20. Therefore, it might be necessary to perform multiple page swaps in order to use one of fDFAs 26 to detect a threat signature in a symbol stream. Each page swap may require one or more write operations and one or more read operations to and from a persistent storage medium 28. Persistent storage medium 28 may comprise a hard drive, a flash memory, compact disc, or another type of persistent storage medium. Because reads from persistent storage medium 28 may be relatively slow, pattern matching module 18 may incur a significant performance penalty for each page swap.

To reduce the number of page swaps performed when determining whether a symbol stream includes one or more threat signatures, pattern matching module 18 may create a new set of "partial deterministic finite automaton" (pDFA) nodes. This disclosure refers to set of pDFA nodes as pDFA 24. Pattern matching module 18 may store nodes of pDFA 24 in a contiguous block of memory locations in memory module 20. The size of this contiguous block of memory locations may be equal to the size of a memory page. Because nodes of pDFA 24 specify transitions only to other nodes of pDFA 24 and because all node of pDFA 24 may be concurrently stored in memory module 20, pattern matching module 18 may not incur page swapping penalties when transitioning between states in pDFA 24.

Each node in pDFA 24 "corresponds" to a node in one of fDFAs 26 that has a visitation level that exceeds a visitation threshold. A visitation level of a node is a measure of how frequently the node becomes the current node. Each node in the set of pDFA nodes specifies a transition for a symbol to a node in pDFA 24 when the corresponding node in the set of fDFA nodes specifies a transition for the symbol to a node in the set of fDFA nodes that has a visitation level that exceeds the visitation threshold. In addition, each node in pDFA 24 specifies a transition for a symbol to a failure node of pDFA 24 when the corresponding node in the set of fDFA nodes specifies a transition for the symbol to a node in the set of fDFA nodes that has a visitation level that does not exceed the visitation threshold. For example, node A in pDFA 24 may "correspond" to node A* in fDFA 26A. Node A* in fDFA 26A may specify a transition for the symbol 'x' to a node B* in fDFA 26A and may specify a transition for the symbol 'y' to a node C* in fDFA 26A. If the visitation level of node B* in fDFA 26A exceeds the visitation threshold, then pDFA 24 includes a node B that "corresponds" to node B*. For this reason, node A in pDFA 24 may specify a transition for the symbol 'x' to node B. On the other hand, if the visitation level of node C* in fDFA 26 does not exceed the visitation threshold, pDFA 24 does not include a node that corresponds to node C*. Because pDFA 24 does not include a node that corresponds to node C*, node A in pDFA 24 specifies a transition to the failure node of the symbol 'y'.

Each node in pDFA 24 may have a corresponding node in a plurality of fDFAs 26. When a node in pDFA 24 has a corresponding node in a plurality of fDFAs 26, the node in pDFA 24 may specify a transition for a symbol to a node in pDFA 24 when the corresponding nodes in fDFAs 26 specify transitions for the symbol to nodes in fDFAs 26 that have visitation levels that exceed the visitation threshold. Furthermore, the node in pDFA 24 may specify a transition for a symbol to a failure node of pDFA 24 when any of the corresponding nodes in fDFAs 26 specifies a transition for the symbol to a node in fDFAs 26 that has a visitation level that does not exceed the visitation threshold. For example, node A in pDFA 24 may correspond to node A* in fDFA 26A, and node A# in fDFA 26B. Node A* in fDFA 26A may specify a transition for the symbol 'x' to node B* in fDFA 26A and a transition for the symbol 'y' to node C* in fDFA 26A. Node A# in fDFA 26B may specify a transition for the symbol 'x' to node B# in fDFA 26B and may specify a transition for the symbol 'z' to node D# in fDFA 26B. In this example, the visitation levels of node B* and B# may exceed the visitation threshold, the visitation level of node C* may exceed the visitation threshold, and the visitation level of node D# does not exceed the visitation threshold. Because nodes B* and B# have visitation levels that exceed the visitation threshold, pDFA 24 may include a node B that corresponds to node B* and B# and may include a node C that corresponds to node C*. Because node D# does not have a visitation level that exceeds the visitation threshold, pDFA 24 does not include a node that corresponds to node D#. For these reasons, node A in pDFA 24 may specify a transition for the symbol 'x' to node B and may specify a transition for the symbol 'y' to node C. But because node D# does not have a corresponding node in pDFA 24, node A in pDFA 24 specifies a transition for the symbol 'z' to the failure node.

To determine whether a symbol stream includes a threat signature, pattern matching module 18 may receive a symbol in the symbol stream. Pattern matching module 18 may then determine whether a current node of pDFA 24 is the failure node of pDFA 24. If the current node of pDFA 24 is not the failure node of pDFA 24, pattern matching module 18 may determine whether the current node maps the received symbol to the failure node of pDFA 24. If the current node of pDFA 24 maps the received symbol to the failure node of pDFA 24, pattern matching module 18 may identify the nodes in fDFAs 26 that correspond to the current node of pDFA 24. Pattern matching module 18 may then set these identified nodes in fDFAs 26 as the current nodes of their respective ones of fDFAs 26. Pattern matching module 18 may then set the failure node of pDFA 26 as the current node of pDFA 26. Next, pattern matching module 18 may process the received symbol with the current nodes of fDFAs 26. On the other hand, if the current node of pDFA 24 maps the received symbol to a node in pDFA 24 other than the failure node, this node becomes the new current node of pDFA 24. pDFA 24 may then receive and process another symbol in the symbol stream.

If the current node of pDFA 24 is the failure node, pattern matching module 18 may process the received symbol using each of fDFAs 26. For example, pattern matching module 18 may first determine which node in fDFA 26A is mapped to the received symbol by the current node of fDFA 26A. This node becomes the new current node of fDFA 26A. Next, pattern matching module 18 may determine which node in fDFA 26B is mapped to the received symbol by the current node of fDFA 26B. This node becomes the new current node of fDFA 26B. In this manner, pattern matching module 18 may perform process the received symbol using each of fDFAs 26. After processing the received symbol using each of fDFAs 26, pattern matching module 18 may receive and process a next symbol in the symbol stream.

Pattern matching module 18 may continue processing symbols in this manner until the end of the symbol stream or until the current node of pDFA 24 or the current node of one of fDFAs 26 is an accepting node. If the current node of pDFA 24 or the current node of one of fDFAs 26 is an accepting node, the symbol stream includes a threat signature. When the symbol stream includes a threat signature, pattern matching module 18 may output search results to application layer module 16. These search results may include pattern identifiers that indicate which threat signature was detected. In addition, these search results may include an index that indicates a position in the symbol stream where the threat signature began. When application layer module 16 receives the search results, application layer module 16 may cause transport layer module 14 to drop packets associated with the symbol stream, divert packets associated with the symbol stream to another destination, or perform some other action. Otherwise, if pattern matching module 18 does not detect a threat signature in the symbol stream, application layer module 16 may cause transport layer module 14 to communicate packets associated with the symbol stream to protected network 6 using network layer module 12 and a second network interface 22.

The techniques described in this disclosure may provide one or more advantages. For example, if pattern matching module 18 were to solely use fDFAs 26 to determine whether symbol streams include a threat signature without use of pDFA 24 (as described herein), each of fDFAs 26 would likely transition primarily among a relatively small set of nodes. Because each of fDFAs 26 would likely transition primarily among this relatively small set of nodes, these nodes would have high visitation levels relative to other nodes in fDFAs 26. However, because it would be unclear which nodes in fDFAs 26 would have the highest visitation levels prior to using the fDFAs, the nodes in fDFAs 26 with the highest visitation levels may be scattered among many memory pages. Because these nodes may be scattered among many memory pages, multiple page swaps may need to be performed in order to use the nodes with the highest visitation levels. However, because pDFA 24 includes nodes that correspond to the nodes of fDFA 26 with the highest visitation levels and because all of these nodes may be stored in memory module 20 at the same time, it may not be necessary to perform any or a substantial number of page swaps in order to use any node in pDFA 24. Furthermore, because the nodes in pDFA 24 corresponds to the nodes in fDFAs 26 that have the highest visitation levels, it may be only occasionally necessary to use any of the nodes in fDFAs 26.

Figure 2:
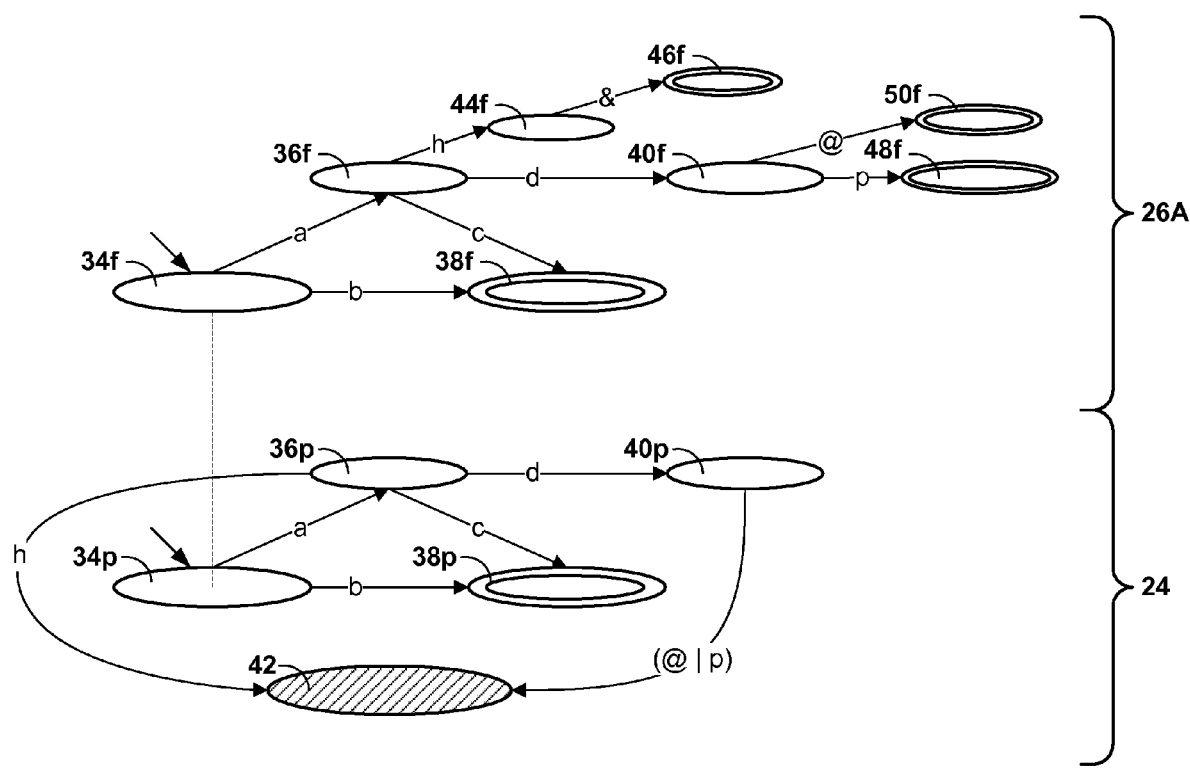
FIG. 2 is a block diagram illustrating an exemplary full deterministic finite automaton and an exemplary partial deterministic finite automaton.

FIG. 2 is a block diagram illustrating an exemplary full deterministic finite automaton (fDFA) 26A and an exemplary partial deterministic finite automaton (pDFA) 24. In the example of FIG. 2, circles represent nodes and arrows represent transitions between nodes. Dotted vertical lines connect nodes in fDFA 26A and pDFA 24 that are corresponding. A node in pDFA 24 may correspond to a node in fDFA 26A when the node in pDFA 24 is a copy of the node in fDFA 26A. Nodes with double circles represent accepting nodes.

Node 34p may be a start state of pDFA 24. Node 34p maps the symbol 'a' to node 36p and maps the symbols 'b' to node 38p. Node 36p maps the symbol 'c' to node 38p and maps the symbol 'd' to node 40p. As illustrated in the example of FIG. 2, node 36p corresponds to node 36f in fDFA 26A.

Node 36f maps the symbol 'h' to node 44f and node 44f maps the symbol '&' to node 46f. Because pDFA 24 does not include a node that corresponds to node 44f, node 36p maps the symbol 'h' to failure node 42. Similarly, node 40p corresponds to node 40f in fDFA 26A. Node 40f maps the symbol '@' to node 50f and maps the symbol 'p' to node 48f. Because pDFA 24 does not include nodes that correspond to nodes 50f and 48f, node 40p maps the symbols '@' and 'p' to failure node 42. Although not shown in the example of FIG. 2, each node in fDFA 26A may map all other symbols to node 34f and each node in pDFA 24 may map all other symbols to node 34p.

Pattern matching module 18 may use fDFA 26A and pDFA 24 to determine whether a symbol stream conforms to a pattern defined by the regular expression "b|ah&|ac|ad (@|p)". For example, if node 34p is the current node of pDFA 24, pattern matching module 18 may determine that a symbol stream conforms with this pattern if the current symbol is the symbol 'b'. In another example, if node 40p is the current node of pDFA 24 and the current symbol is the symbol '@', pattern matching module 18 may set the current node of fDFA 26A to node 40f and then obtain node 40f from memory module 20. Subsequently, pattern matching module 18 may set the current node of pDFA 24 to failure node 42. After setting the current node of pDFA 24 to failure node 42, pattern matching module 18 may determine that node 40f maps the symbol '@' to node 50f. Because node 50f is an accepting state, pattern matching module 18 may then accept the symbol string.

Figure 3:
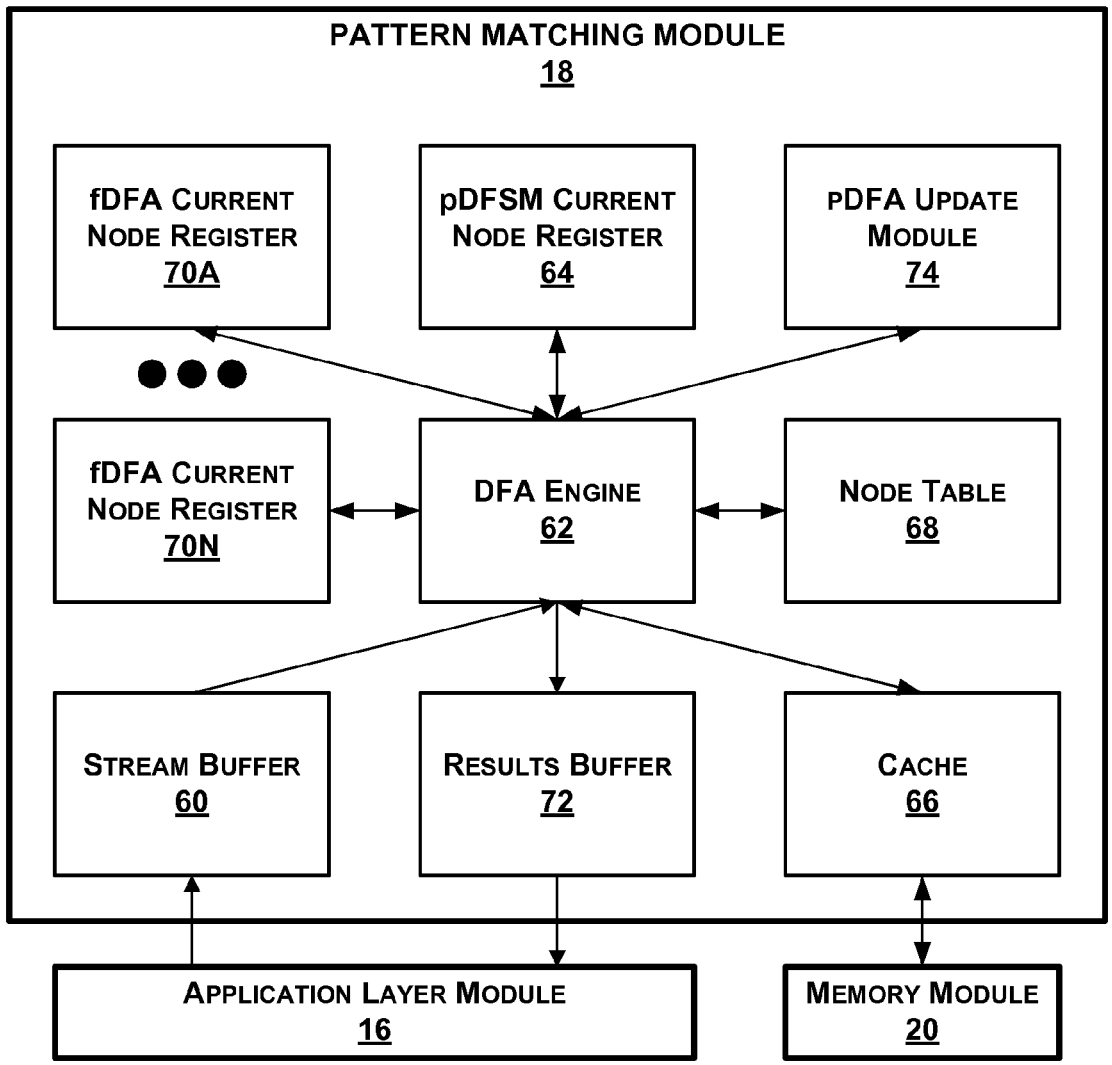
FIG. 3 is a block diagram illustrating details of an exemplary pattern matching module.

FIG. 3 is a block diagram illustrating details of exemplary pattern matching module 18. In the example of FIG. 3, pattern matching module 18 includes a stream buffer 60. Stream buffer 60 receives a symbol stream from application layer module 16. When stream buffer 60 receives the symbols, stream buffer 60 may buffer the symbol stream until a DFA engine 62 uses the symbol stream.

DFA engine 62 processes the symbol stream from stream buffer 60 in order to determine whether the symbol stream causes pDFA 24 or one or more of fDFAs 26 to enter an accepting state. When DFA engine 62 determines that the symbol stream causes pDFA 24 or one or more of fDFAs 26 to enter an accepting state, DFA engine 62 may output an indicator to a results buffer 72. This indicator may indicate that the stream of symbols includes a threat signature. Application layer module 16 may receive indicators in results buffer 72 and perform various actions based on these indicators.

In order to determine whether a symbol stream causes pDFA 24 or one or more of DFAs 26 to enter an accepting state, DFA engine 62 may retrieve nodes of pDFA 24 or fDFAs 26 from memory module 20. When DFA engine 62 retrieves a node from memory module 20, matching module 62 may send a request to read a memory location to a cache 66. If cache 66 contains the requested memory location, cache 66 may respond to the request and provide the requested memory location to DFA engine 62. Otherwise, if cache 66 does not contain the requested memory location, cache 66 may forward the request to memory module 20. When memory module 20 responds to this request, cache 66 may store a copy of the data at the memory location. In this way, cache 66 may store data that DFA engine 62 has recently used. In general, DFA engine 62 tends to access a relatively small number of nodes in pDFA 24 and fDFAs 26. For this reason, cache 66 may be able to respond to a large number of memory read requests from DFA engine 62.

In the example of FIG. 3, pattern matching module 18 includes a pDFA current node register 64. pDFA current node register 64 stores a node index of a current node in pDFA 24. Furthermore, pattern matching module 18 includes fDFA current node registers 70A through 70N (collectively, "fDFA current node registers 70"). Each of fDFA current node registers 70 may store a node index of a current node in a different one of fDFAs 26.

Pattern matching module 18 may also include a node table 68. Node table 68 may include an entry for each node in pDFA 24. An entry in node table 68 for a node in pDFA 24 may specify a node in each one of fDFAs 26 that corresponds to the node in pDFA 24. For example, each entry in node table 68 may specify an fDFA base index and an fDFA node index for each one of fDFAs 26. An fDFA base index may be a memory address of a first memory location of a block of memory that stores a node of one of fDFAs 26 and a fDFA node index may indicate a memory location relative to an fDFA base index. In this example, DFA engine 62 may derive a memory address of a node in one of fDFAs 26 by adding an fDFA node index to an fDFA base index.

When DFA engine 62 receives a symbol (i.e. the "current symbol") from stream buffer 60, DFA engine 62 may first determine whether value of pDFA current node register 64 is equal to the node index of the failure node of pDFA 24. If the node index in pDFA current node register 64 is not equal to the node index of the failure node of pDFA 24, DFA engine 62 may use the node index in pDFA current node register 64 to request a node in pDFA 24 at a memory location in memory module 20 indicated by this node index. This node is referred to herein as the "current node" of pDFA 24. When DFA engine 62 receives the current node of pDFA 24, DFA engine 62 may set the value of pDFA current node register 64 to the node index to which the current node of pDFA 24 maps the current symbol. In this way, the node in pDFA 24 indicated by the node index to which the current node maps the current symbol becomes the new current node of pDFA 24. DFA engine 62 may update the visitation level of the new current node of pDFA 24. For example, DFA engine 62 may increment a counter that represents the visitation level of the new current node of pDFA 24.

If the previous current node of pDFA 24 maps the current symbol to the failure node of pDFA 24, DFA engine 62 may set the values of fDFA current node registers 70 to the node indexes specified in node table 68 as corresponding to the previous current node of pDFA 24. In this way, the nodes in fDFAs 26 that correspond to the previous current node of pDFA 24 become the new current nodes of fDFAs 26. After setting the values of fDFA current node registers 70, DFA engine 62 may update the visitation levels of each of the new current nodes of each of fDFAs 26.

When the new current node of pDFA 24 is the failure node of pDFA 24, DFA engine 62 may process the current symbol and all subsequent symbols of the symbol stream with fDFAs 26. In order to process a symbol with fDFAs 26, DFA engine 62 may loop through each of fDFAs 26 and perform any transitions for the symbol that are specified by the respective current nodes of fDFAs 26.

Pattern matching module 18 may create and update pDFA 24 in a variety of ways. In one example, pattern matching module 18 includes only a single fDFA. In this example, DFA engine 62 may determine whether the size of pDFA 24 exceeds a given size threshold. For example, pDFA 24 may exceed a size threshold when adding an additional node to pDFA 24 would cause pDFA 24 to occupy more than one memory page. When IDP device 4 boots, pDFA 24 may contain only a start node and a failure node. If the size of pDFA 24 does not exceed the size threshold, DFA engine 62 may instruct a pDFA update module 74 in pattern matching module 18 to update pDFA 24. To update pDFA 24, pDFA update module 74 may retrieve from memory module 20 a current fDFA node that corresponds to the current node of pDFA 24. Then, pDFA update module 74 may then create a new node in pDFA 24. For each transition specified in the current fDFA node to another node in the fDFA having a corresponding node in pDFA 24, the created pDFA node specifies a transition to the corresponding node in pDFA 24. In addition, for each of the transitions specified in the one of the fDFA nodes to other nodes in the fDFA that do not have corresponding nodes in pDFA 24, pDFA node specifies a transition to a failure node in the partial DFA. pDFA update module 74 may also identify nodes in pDFA 24 that specify transitions to the failure node for a symbol. Each of the identified nodes in pDFA 24 has a corresponding node in the fDFA that specifies a transition for this symbol to the node in the fDFA that corresponds to the created pDFA node. After identifying these nodes pDFA 24, pDFA update module 74 may then update each of the identified nodes in pDFA 24 such that the each identified node specifies a transition to the created pDFA node for the symbol rather than the transition for the symbol to the failure node.

Continuing the example in which pattern matching module 18 includes a single fDFA, if adding another node to pDFA 24 would cause pDFA 24 to exceed the size threshold, pDFA update module 74 may determine whether the visitation level of the current node of the fDFA is greater than the visitation level of a node in pDFA 24. If the visitation level of the current node of the fDFA is not greater than the visitation level of a node in pDFA 24, pDFA update module 74 does not update pDFA 24. If the visitation level of the current node of the fDFA is greater than the visitation level of a node in pDFA 24, pDFA update module 74 may remove this node from pDFA 24 and update those nodes in pDFA 24 that include mappings from symbols to the removed node. pDFA update module 74 may then add a copy of the current node to pDFA 24 and update the node and other nodes in pDFA 24.

In another example, pDFA update module 74 may perform a different operation to update pDFA 24 when pattern matching module 18 includes a plurality of fDFAs 26. In this example, pDFA update module 74 may update pDFA 24 on a periodic basis. When pDFA update module 74 performs such a periodic update, pDFA update module 74 may create a temporary pDFA for each of fDFAs 26. Each of these temporary pDFAs may include nodes that correspond to those nodes of the respective fDFAs that have visitation levels that exceed a visitation threshold. In creating the temporary pDFAs, pDFA update module 74 may update pDFA indexes in entries in node table 68 to indicate nodes in fDFAs 26 that correspond to the nodes in the temporary pDFAs. After creating the temporary pDFAs for each of fDFAs 26, pDFA update module 74 may merge the temporary pDFAs into a single pDFA. Once pDFA update module 74 completes the merger of the pDFAs into a single pDFA, DFA engine 62 may use this single pDFA as described above in regards to pDFA 24.

In order to merge the temporary pDFAs into a single pDFA, pDFA update module 74 may identify the start nodes of each of the temporary pDFAs. Next, pDFA update module 74 may "merge" these nodes. To merge nodes, pDFA update module 74 may create a new "merged" node. An entry in node table 68 for this merged node may specify each node in fDFA 26 that corresponds to any of the nodes merged into the "merged" node. Furthermore, this new merged node may specify a visitation level equal to the combined visitation levels of each of the nodes that were merged into this new node.

This merged node specifies each of the transitions specified in each of the nodes that were merged into this merged node. For example, a first node in a first temporary pDFA may specify a transition to a second node in the first temporary pDFA for the symbol 'a' and a transition to a third node in the first temporary pDFA for the symbol 'b'. Furthermore, a first node in a second temporary pDFA may specify a transition to a second node in the second temporary pDFA for the symbol 'b' and a transition to a third node in the second temporary pDFA for the symbol 'c'. In this example, when the first node of the first temporary pDFA and the first node of the second temporary pDFA are merged, the merged node specifies a transition to a second node in the first temporary pDFA for the symbol 'a', a transition to a third node in the first temporary pDFA for the symbol 'b', a transition to a second node in the second temporary pDFA for the symbol 'b', and a transition to a third node in the second temporary pDFA for the symbol 'c'.

After pDFA update module 74 creates the merged node, pDFA update module 74 may delete each of the nodes that were merged into the merged node from memory module 20. pDFA update module 74 may also remove entries in node table 68 for each of the nodes that were merged into the merged node.

pDFA update module 74 may identify sets of transitions in the merged node to different nodes in different temporary pDFAs for a single symbol. In the previous example, pDFA update module 74 may identify the transition to the third node of the first temporary pDFA for the symbol 'b' and the transition to the second node of the second temporary pDFA for the symbol 'b' as transitions to different for a single symbol. For each of the identified sets of transitions in the merged node to different nodes for a single symbol, pDFA update module 74 merges these different nodes. pDFA update module 74 may merge these different nodes in the way that is presently being described. When pDFA update module 74 finishes merging these different nodes, pDFA update module 74 removes the transitions in the merged node to the different nodes for the single symbol. pDFA update module 74 may replace these transitions in the merged node with a transition for the symbol to the node resulting from the merger of these different nodes. Continuing the previous example, when pDFA update module 74 finishes creating the merged node, the merged node may specify a transition to the second node in the first temporary pDFA for the symbol 'a', a transition to a new node for the symbol 'b', and a transition to the third node in the second temporary pDFA for the symbol 'c'. By the end of this operation the merged node does not include any transitions to different nodes for a single symbol.

Figure 4:
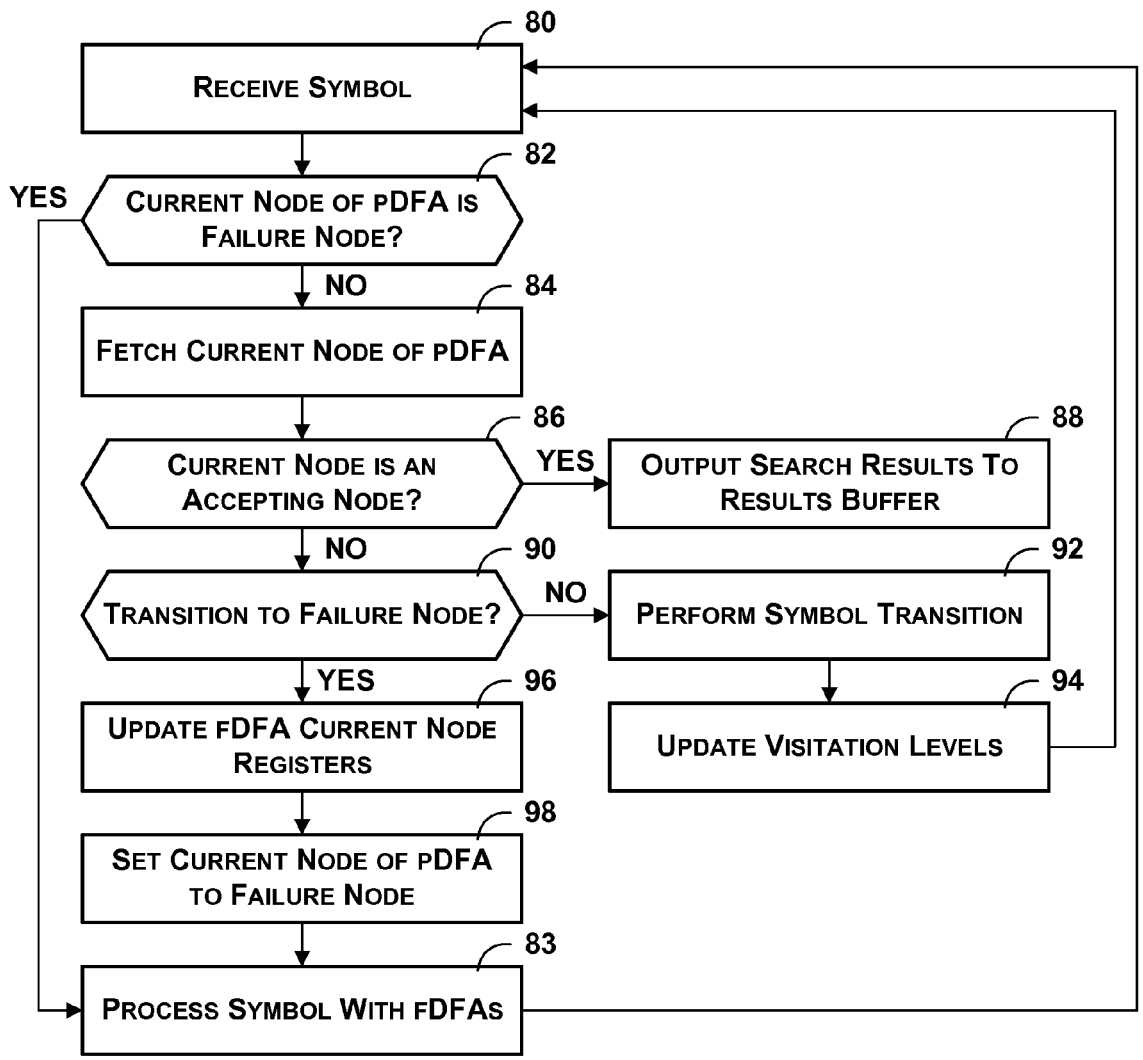
FIG. 4 is a flowchart illustrating an exemplary operation of the pattern matching module.

FIG. 4 is a flowchart illustrating an exemplary operation of pattern matching module 18. Initially, DFA engine 62 receives a symbol from symbol buffer 60 (80). After receiving the symbol, DFA engine 62 determines whether the current node of pDFA 24 is the failure node (82). DFA engine 62 may determine whether the current node of pDFA 24 is the failure node by retrieving the value stored in pDFA current node register 64 and determining whether this value equals the index known to represent the failure node. If DFA engine 62 determines that the current node of pDFA 24 is the failure node ("YES" of 82), DFA engine 62 may process the received symbol using fDFAs 26 (83). For example, DFA engine 62 may perform the example operation illustrated in FIG. 5 to process the received symbol using fDFAs 26.

If DFA engine 62 determines that the current node of pDFA 24 is not the failure node ("NO" of 82), DFA engine 62 may use the node index stored in pDFA current node register 64 to fetch the current node of pDFA 24 (84). In order to fetch the current node of pDFA 24, DFA engine 62 may generate a read request that may be answered by cache 66 or memory module 20. After fetching the current node of pDFA 24, DFA engine 62 may determine whether the current node of pDFA 24 is an accepting node (86). If the current node of pDFA 24 is an accepting node ("YES" of 86), DFA engine 62 may output search results to results buffer 72 (88). For example, DFA engine 62 may output a number to results buffer 72 that indicates which threat signature was recognized. On the other hand, if the current node of pDFA 24 is not an accepting node ("NO" of 86), DFA engine 62 may determine whether the current symbol causes a transition to the failure node (90).

If the current symbol does not cause a transition to the failure node ("NO" of 90), DFA engine 62 may perform the symbol transition indicated in the current node (92). In other words, DFA engine 62 may set the value in pDFA current node register 64 to be the node index that the current node of pDFA 24 maps to the current symbol. In this way, the node indicated by the node index that the current node of pDFA 24 maps to the current symbol becomes the new "current node" of pDFA 24. After performing the symbol transition, DFA engine 62 may increment visitation levels of the new current node of pDFA 24 (94). By incrementing the visitation levels, DFA engine 62 keeps track of how many times pDFA 24 transitions to a node. Once DFA engine 62 finishes incrementing the visitation levels for the current node of pDFA 24, DFA engine 62 may loop back and receive a new symbol (80).

If the current symbol causes a transition to the failure node ("YES" of 90), DFA engine 62 may update fDFA current node registers 70 (96). For example, DFA engine 62 may set the values of fDFA current node registers 70 to the corresponding node indexes specified in an entry for the current node of pDFA 24 in node table 68. If node table 68 does not specify a node index for one of fDFAs 26, DFA engine 62 may set the one of fDFA current node registers 70 associated with this one of fDFAs 26 to the base value of the one of fDFAs 26. After updating fDFA current node registers 70, DFA engine 62 may set the value of pDFA current node register 64 to the index of the failure node of pDFA 24 (98). After setting the value of pDFA current node register 64 to the index of the failure node of pDFA 24, DFA engine 62 may process the current symbol using fDFAs 26 (83). To process the current symbol using fDFAs 26, DFA engine 62 may use the example operation illustrated in FIG. 5. After processing the current symbol with fDFAs 26, DFA engine 62 may loop back and receive another symbol (80).

Figure 5:
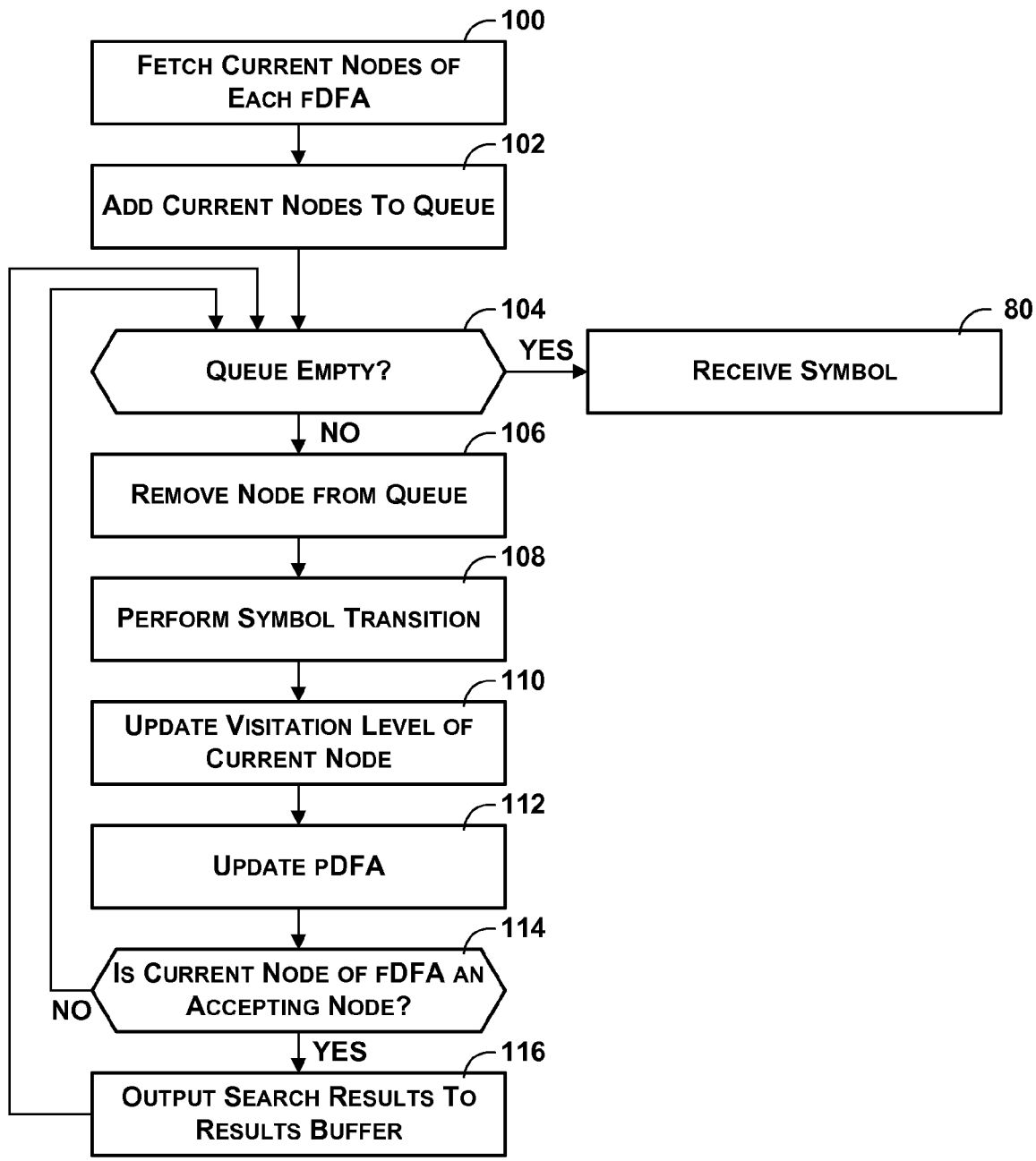
FIG. 5 is a flowchart illustrating an exemplary operation to process a symbol using one or more full deterministic finite automata.

FIG. 5 is a flowchart illustrating an exemplary operation to process a received symbol with a set of one or more fDFAs. Initially, DFA engine 62 fetches from memory module 20 or cache 66 each of the nodes indicated by fDFA current node registers 70 (100). After fetching these nodes, DFA engine 62 may add each of these nodes to a queue (not shown) (102).

DFA engine 62 may then determine whether the queue is empty (104). If the queue is empty ("YES" of 104), DFA engine 62 may receive a new symbol and may perform the example operation illustrated in FIG. 4 (80). On the other hand, if the queue is not empty ("NO" of 104), DFA engine 62 may remove a node of one of fDFAs 26 from the queue (106). This disclosure may refer to this one of fDFAs 26 as the "current fDFA" and may refer to this node as the "current node of the current fDFA." After removing the current node of the current fDFA from the queue, DFA engine 62 may perform a transition to a second node in the current fDFA specified by the current node for the received symbol (108). When DFA engine 62 performs this transition, DFA engine 62 may update the one of fDFA current node registers 70 associated with the current fDFA in order to indicate that the new current node of the current fDFA is the second node in the current fDFA.

After DFA engine 62 performs the symbol transition, DFA engine 62 may increment the visitation level for the new current node of the current fDFA (110). DFA engine 62 may then update pDFA 24 (112). For example, DFA engine 62 may update pDFA 24 using the example operation illustrated in FIG. 6. When DFA engine 62 finishes updating pDFA 24, DFA engine 62 may determine whether the current node of the current fDFA is an accepting node (114). If the current node of the current fDFA is an accepting node ("YES" of 114), DFA engine 62 may output search results to results buffer 72 (116). On the other hand, if the current node of the current fDFA is not an accepting node ("NO" of 114), DFA engine 62 may loop back and once again determine whether the queue is empty (80).

Figure 6:
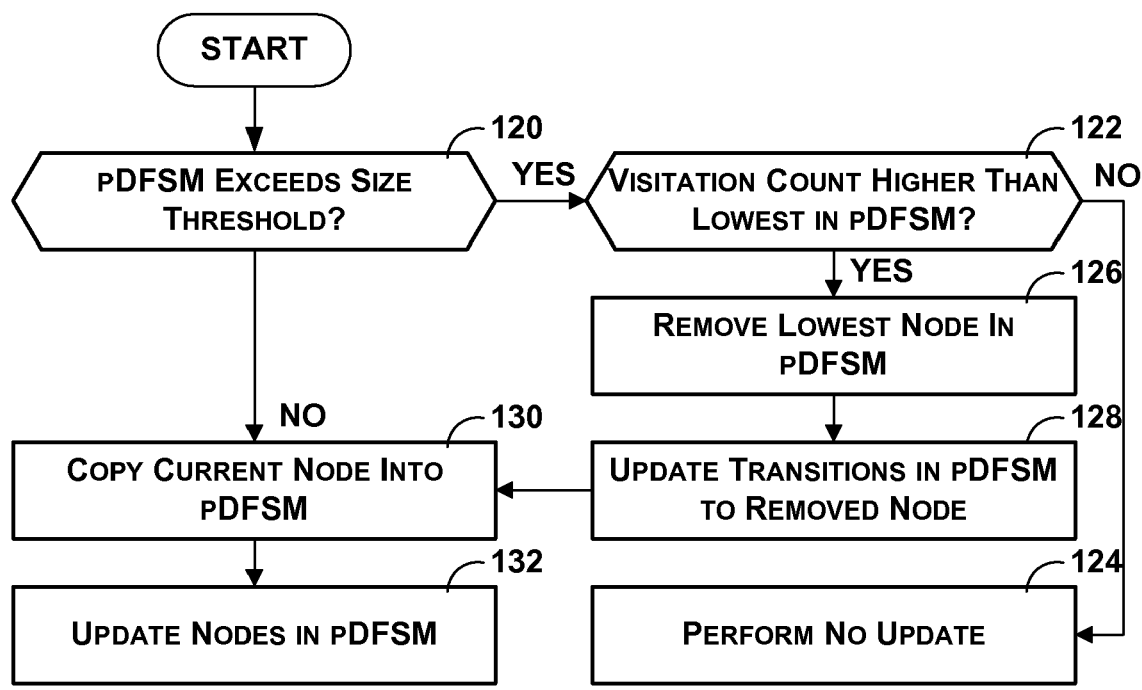
FIG. 6 is a flowchart illustrating an exemplary operation that a matching engine may perform in order to update the partial deterministic finite automaton.

FIG. 6 is a flowchart illustrating an exemplary operation that DFA engine 62 may perform in order to update pDFA 24 when memory module 20 includes a single fDFA. Initially, pDFA update module 74 may determine whether pDFA 24 exceeds a size threshold (120). For example, pDFA update module 74 may determine that pDFA 24 exceeds a size threshold when pDFA 24 includes one hundred nodes. If pDFA 24 exceeds the size threshold ("YES" of 120), pDFA update module 74 may determine whether the visitation level of the current node of the fDFA is greater than the lowest visitation level of a node in pDFA 24 (122). If the visitation level of the current node of the fDFA is not greater than the lowest visitation level of a node in pDFA 24 ("NO" of 122), DFA engine 62 does not update pDFA 24 (124). If the visitation level of the current node of the fDFA is greater than the lowest visitation level of a node in pDFA 24 ("YES" of 122), DFA engine 62 may remove this node from pDFA 24 (126). After removing the node from pDFA 24, DFA engine 62 may scan through the nodes in pDFA 24 and replace any transitions to the removed node with transitions to the failure node of pDFA 24 (128).

If pDFA 24 does not exceed the node threshold ("NO" of 120), pDFA update module 74 may make a copy of the current node of the fDFA in the memory space of pDFA 24 (130). pDFA update module 74 may also make a copy of the current node of the fDFA in the memory space of pDFA 24 after removing the node in pDFA 24 that has the lowest visitation level. pDFA update module 74 may make this copy in a memory location that immediately follows a node in pDFA 24 that DFA engine 62 accessed prior to transitioning to the current node. In this way, pDFA update module 74 may enhance the likelihood that a copy of the current node of pDFA 24 will be stored in cache 66. After making a copy of the current node of the fDFA in the memory space of pDFA 24, pDFA update module 74 may update nodes in the fDFA to reference this node in pDFA 24 (132). In order to update nodes in pDFA 24, pDFA update module 74 may scan through the nodes in pDFA 24 and identify those nodes that specify transitions to the current node. PDFA update module 74 may then change the transitions specified in the identified nodes from transitions to the failure state to transitions to the copy of the current state in pDFA 24.

Updating pDFA 24 may require a number of clock cycles that is not insignificant. For this reason, when pDFA 24 exceeds the size threshold, matching module 62 may only instruct pDFA update module 74 to update pDFA 24 periodically. For example, after pDFA 24 exceeds the size threshold, matching module 62 may instruct pDFA update module 74 to update pDFA 24 only once every five minutes.

Figure 7:
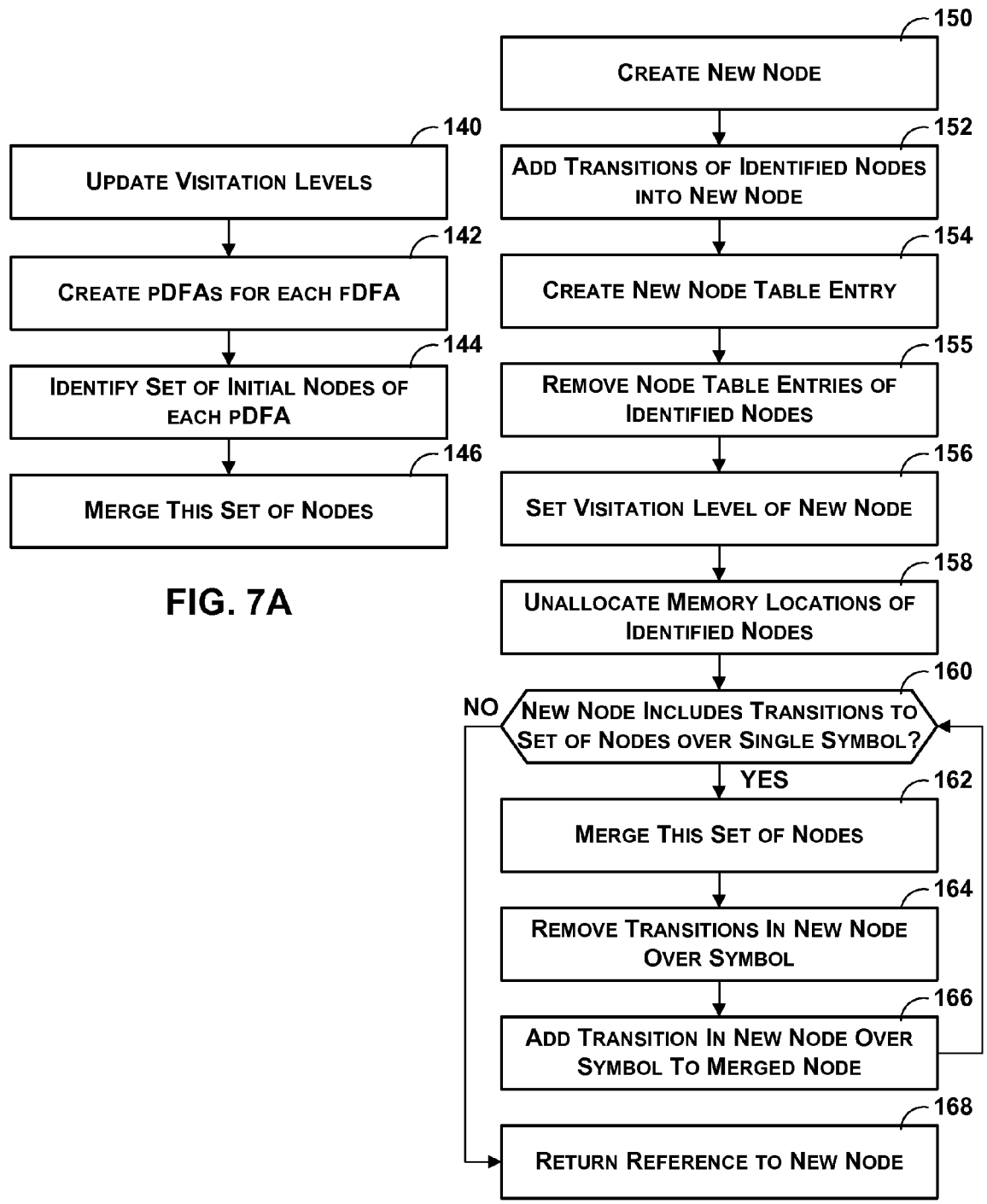
FIG. 7 is a flowchart illustrating an exemplary operation of a partial deterministic finite automaton update module to perform a periodic update of the partial deterministic finite automaton.

FIGS. 7A and 7B are flowcharts illustrating an exemplary operation of pDFA update module 74 to create a pDFA using multiple fDFAs. In the example of FIG. 7A, when pDFA update module 74 receives a request from DFA engine 62 to perform an update of pDFA 24 using fDFAs 26, pDFA update module 74 may update the visitation levels of each node in fDFAs 26 that corresponds to a node in the current pDFA (140). For example, pDFA update module 74 may copy counters that represent the visitation levels of the nodes in the current pDFA into counters that represent the visitation levels of respective ones of the nodes in fDFAs 26 that corresponds to the nodes in the current pDFA. In a second example, pDFA update module 74 may, for each node in the current pDFA, calculate an average of a counter that represents the visitation level of the node in the current pDFA with counter of a corresponding node in one of fDFAs 26. In this second example, pDFA update module 74 may then store this calculated average as the visitation level of the corresponding node in the one of fDFAs 26. In this way, the visitation levels of nodes of fDFAs 26 represent moving averages of the numbers of times that the nodes, or corresponding nodes in the pDFA, have been the current node of the fDFA or the pDFA.

After updating the visitation levels, pDFA update module 74 may create new temporary pDFAs for each of fDFAs 26 (142). Each of the temporary pDFAs may include nodes that correspond to nodes in the respective fDFAs that have visitation levels that exceed a given visitation threshold. In creating the temporary pDFAs, pDFA update module 74 may update entries in node table 68 to reflect the existence of the nodes in the temporary pDFAs.

After creating the temporary pDFAs for each of fDFAs 26, pDFA update module 74 may identify a set of nodes in the temporary pDFAs that are start nodes (144). Next, pDFA update module 74 may invoke a merge operation on the identified set of nodes in order to create a new pDFA (146). Counters that represent visitation levels of each node in the new pDFA may be set to zero. In this way, the counters of nodes in a pDFA may only indicate the number of times that the node in the pDFA was the current node of the pDFA since the last time pDFA update module 74 created the pDFA.

FIG. 7B illustrates an exemplary operation of pDFA update module 74 to perform a merge operation on a set of identified temporary pDFA nodes. Initially, pDFA update module 74 may create a new node (150). After creating this new node, pDFA update module 74 may add to the new node each of the transitions specified in the identified nodes (152). In addition, pDFA update module 74 may create an entry in node table 68 for the new node (154). The entry in node table 68 for the new node may include a node index of each of the nodes in fDAs 26 that correspond to one or more of the identified nodes (154). Next, pDFA update module 74 may remove node table entries of the identified nodes from node table 68 (155). After pDFA update module 74 removes these entries from node table 68, pDFA update module 74 may set the visitation level of the new node to an aggregated visitation level of each of the identified nodes (156). For example, if the visitation levels of the identified nodes are visitation counts, pDFA update module 74 may set the visitation level of the new node to the sum total of the visitation counts of the identified nodes. Next, pDFA update module 74 may unallocate the memory locations in memory module 20 that store each of the identified nodes (158). Unallocating the memory locations that store the identified nodes may allow those memory locations to be reused.

After unallocating the memory locations that store the identified nodes, pDFA update module 74 may determine whether the new node includes transitions to a set of two or more pDFA nodes for a single symbol (160). If the new node includes transitions to a set of two or more pDFA nodes for a single symbol ("YES" of 160), pDFA update module 74 may merge this set of nodes (162). pDFA update module 74 may merge this set of pDFA nodes by recursively using the exemplary operation illustrated in FIG. 7B. After pDFA update module 74 merges this set of pDFA nodes, pDFA update module 74 may remove transitions from the new node to the pDFA nodes in this set of pDFA nodes for the single symbol (164). Next, pDFA update module 74 may update the new node to specify a transition for the symbol from the new node to the node resulting from the merger of this set of pDFA nodes (166). When pDFA update module 74 adds this transition to the new node, pDFA update module 74 may loop back and again determine whether the new node includes transitions to a set of two or more pDFA nodes (160).

If the new node does not include transitions to a set of two or more pDFA nodes for a single symbol ("NO" of 160), pDFA update module 74 may return a pDFA index of the new node (168).

Figure 8:
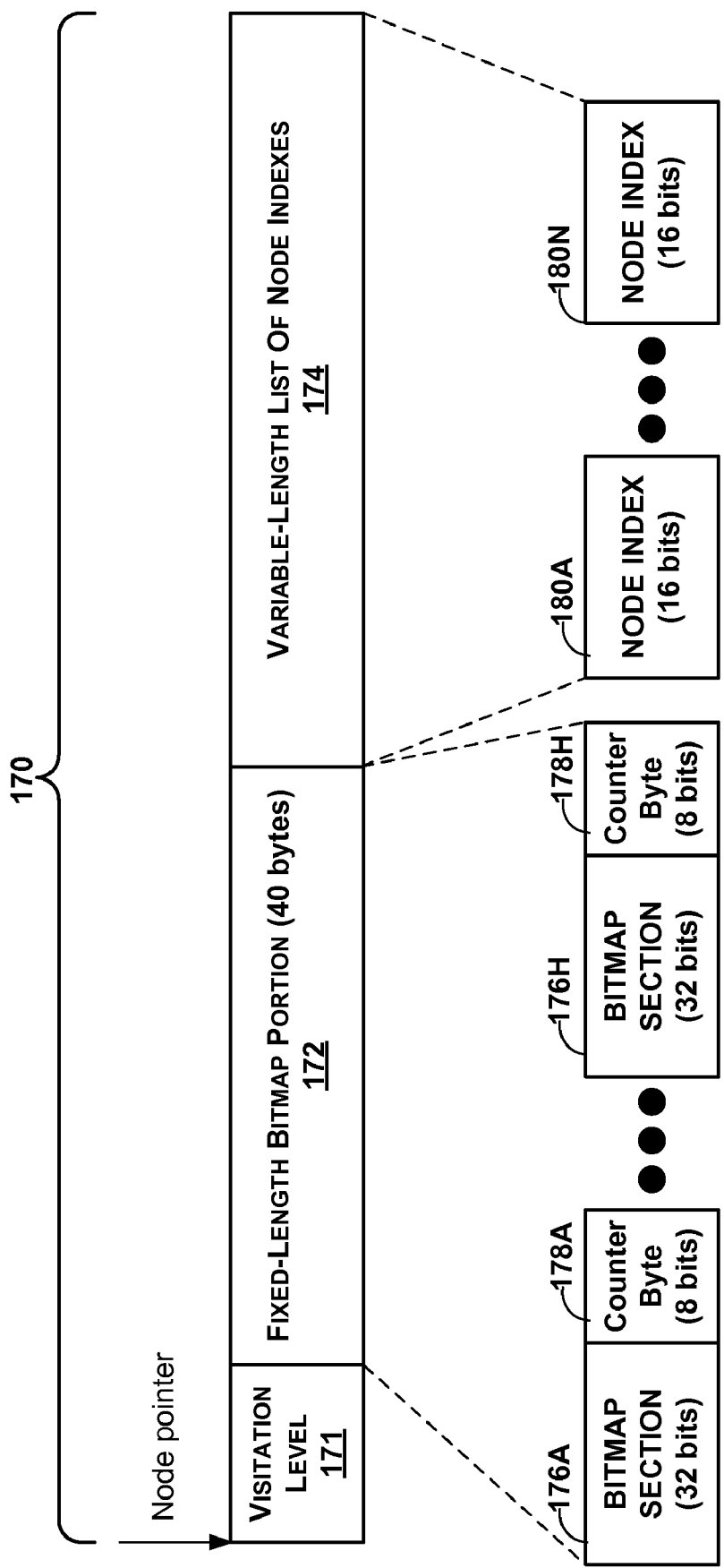
FIG. 8 is a block diagram illustrating an exemplary format of a node in a deterministic finite automaton.

FIG. 8 is a block diagram illustrating an exemplary format of a node 170 in a finite automaton. Node 170 may be used in pDFA 24 and in fDFAs 26.

In the example format illustrated in FIG. 8, node 170 comprises a visitation level field 171, a fixed-length bitmap portion 172, and a variable-length list of node indexes 174. Visitation level field 171 may store a numerical value that represents a visitation level of node 170. Bitmap portion 172 is 40 bytes (320 bits) long. The length of list of node indexes 174 is variable, but may be no more than 512 bytes (4096 bits) long.

List of node indexes 174 may comprise up to 256 node indexes. In the example of FIG. 8, these node indexes are labeled 180A through 180N. This disclosure may refer collectively to node indexes 180A through 180N as "node indexes 180." Each of node indexes 180 may be a 16-bit value from which DFA engine 62 may derive a memory address for a node in either pDFA 24 or fDFAs 26. For example, DFA engine 62 may add the value stored in one of node indexes 180 to a memory address of a first node in order to obtain a memory address of a node.

Bitmap portion 172 may comprise a set of eight bitmap sections 176A through 146H (collectively, "bitmap sections 176"). Together bitmap sections 176 include 256 bits. Each of these 256 bits may be associated with a different symbol or a different meta-symbol class. For example, the $65^{th}$ bit in bitmap sections 176 may be associated with the symbol 'A', the $66^{th}$ bit in bitmap sections 176 may be associated with the symbol 'B', and so on. In another example, the $126^{th}$ bit in bitmap sections 176 may be associated with the meta-symbol class that is limited to upper case symbols in the Latin alphabet.

In addition to bit map sections 176, bitmap portion 172 may include a set of eight counter bytes 178A through 148H (collectively, "counter bytes 178"). Each of counter bytes 178 may immediately follow a different one of bitmap sections 176 in bitmap portion 172. For example, counter byte 178A may immediately follow bitmap section 176A, counter byte 178B may immediately follow bitmap section 176B, and so on in the manner. Each one of counter bytes 178 may contain a value that indicates the number of bits that are set to '1' in the ones of bitmap sections 176 to the left of the counter byte. For example, suppose that three bits of bitmap section 176A are set to '1'. In this example, counter byte 178A may contain the value '3'. Continuing this example, suppose that five bits of bitmap section 176B are set to '1'. Here, counter byte 178B may contain the value '8' because three bits in bitmap section 176A are set to '1' and five bits in bitmap section 176B are set to '1'.

A bit in bitmap sections 176 set to '0' indicates that a DFA transitions to a start node from node 170 when the DFA receives a symbol associated with that bit. For example, the $65^{th}$ bit may be associated with the symbol 'A' and may be set to '0'. In this example, when node 170 is the current node of a DFA and the DFA receives the symbol 'A', the start node becomes the current node of the DFA.

On the other hand, a bit in bitmap sections 176 set to '1' indicates that a DFA that includes node 170 may transition to a node in the DFA other than the start node when the DFA receives a symbol associated with that bit. For example, the $65^{th}$ bit may be associated with the symbol 'A' and may be set to '1'. In this example, when node 170 is the current node of a DFA and the DFA receives the symbol 'A', a node other than the start node becomes the current node of the DFA.

DFA engine 62 may use the values in counter bytes 178 to determine which node becomes the current node. In order to use the values in counter bytes 178, DFA engine 62 may obtain the value of the one of counter bytes 178 immediately to the left of the one of bitmap sections 176 that contains a bit associated with the current symbol. For example, if the $76^{th}$ bit is associated with the symbol 'K', this bit is in bitmap section 176C. In this example, counter byte 178B is the counter byte immediately to the left of bitmap section 176C. After obtaining the value from the one of counter bytes 178, DFA engine 62 may determine how many bits to the left of the bit associated with the current symbol are set to '1' in the bitmap section that includes the bit associated with the current symbol. For example, suppose that the bits of bitmap section 176C are set as follows: 0100 1000 0110 0001 0000 0001. If the bit associated with the current symbol is the $11^{th}$ bit in bitmap section 176C (i.e., the $76^{th}$ bit in bitmap sections 176), DFA engine 62 determines that there are three bits to the left of the $76^{th}$ bit that are set to '1'.

After determining how many bits in the bitmap section that includes the bit associated with the current symbol to the left of the bit that is associated with the current symbol are set to '1', DFA engine 62 may add this number with the number of bits that are set to '1' in the bitmap sections to the left of this bitmap section. For example, if counter byte 178B indicates that there are eight bits set to '1' in bitmap sections 176A and 146B, and there are three bits to the left of the bit associated with the current symbol in bitmap section 176C, then DFA engine 62 determines that there are eleven bits to the left of the bit associated with the current symbol in bitmap sections 176 that are set to '1'.

DFA engine 62 may use the number of bits to the left of the bit associated with the current symbol in bitmap sections 176 that are set to '1' to find a node index in list of node indexes 174. For example, if there are eleven bits to the left of the bit associated with the current symbol in bitmap sections 176 that are set to '1', then DFA engine 62 accesses the $11^{th}$ one of node indexes 180.

Using this format may save space in memory and may accelerate the processing of nodes. For example, a convention format for a node may include a node index for each possible symbol. In this conventional format, if there are 256 possible symbols and each index is 2 bytes, a node requires at least 512 total bytes of memory. In general, each node may have, on average, 16 transitions to non-start states. Thus, an average node in the presented format requires only 72 bytes (40 bytes for bitmap portion 172 and 32 bytes for 16 two byte node indexes). Furthermore, the presence of counter bytes 178 may accelerate the processing of a node because DFA engine 62 does not need to count all of the bits in bitmap sections 176 to the left of the bitmap section that include the bit associated with the current symbol. This may save processing time and power.

The functions described in this disclosure may be applied to intrusion detection and prevention in any of a variety of data stored and/or retrieved using data storage media or communicated, e.g., transmitted and/or received, via a wired or wireless communication system. Examples of wired and wireless communication systems include any communication techniques including without limitation wireless transmission using CDMA, GSM, 802.11, Bluetooth, ultra wide band (UWB), OFDM, FDMA, TDMA, W-CDMA, or any other radio access techniques or technologies, and wired or wireless transmission using any of a variety of network protocols such as TCP/IP, ATM, or the like. The functions may be applied to any type of data including but not limited to music data, video data, multimedia data, or other entertainment data, financial data, security data, business data, government data, military data, marketing data, sales data, medical patient data, medical diagnostic data, medical imaging data, data representing graphical or textual content, image data, chemical data, geographic data, mapping data, television broadcast data, radio broadcast data, email data, Internet data, personal data, or the like.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various embodiments of the invention have been described. These and other embodiments are within the scope of the following claims.

The invention claimed is:

1. A method comprising:
   storing a set of full deterministic finite automaton (fDFA) nodes, wherein the fDFA nodes represent a full deterministic finite automaton fDFA that accepts symbol streams that conform to a symbol pattern, the symbol pattern being associated with a computer security threat;
   creating a set of pDFA nodes, wherein the pDFA nodes represent a partial deterministic finite automaton (pDFA),
      wherein each of the pDFA nodes has a corresponding node in the fDFA nodes that has a visitation level that exceeds a visitation threshold,
      wherein each node in the pDFA nodes specifies a transition for a symbol to a node in the pDFA nodes when the corresponding node in the fDFA nodes specifies a transition for the symbol to a node in the fDFA nodes that has a visitation level that exceeds the visitation threshold, and
      wherein each node in the pDFA nodes specifies a transition for a symbol to a failure node in the pDFA nodes when the corresponding node in the fDFA nodes specifies a transition for the symbol to a node in the fDFA nodes that has a visitation level that does not exceed the visitation threshold;
   receiving a symbol in a symbol stream;
   determining whether a current node of the pDFA nodes is a failure node;
   determining, when the current node of the pDFA nodes is not the failure node, whether the current node of the pDFA nodes specifies a transition for the symbol to the failure node;
   when the current node of the pDFA nodes specifies a transition for the symbol to the failure node, accessing the set of fDFA nodes to identify a node in the fDFA nodes that corresponds to the current node of the pDFA nodes as a current node of the fDFA nodes; and detecting a computer security threat when the current node of the pDFA nodes is the failure node and when the current node of the fDFA nodes specifies a transition for the symbol to an accepting node or when the current node of the pDFA nodes specifies a transition for the symbol to an accepting node.

2. The method of claim 1, further comprising storing the set of pDFA nodes in a single memory page.

3. The method of claim 1, wherein the method further comprises:
   receiving network traffic from a first computer network;
   extracting at least some of the symbol stream from the network traffic; and
   retransmitting the network traffic on a second computer network when the symbol stream does not cause the pDFA or the fDFA to transition to an accepting node.

4. The method of claim 1,
   wherein the method further comprises maintaining a table that has entries that identify a corresponding node in the fDFA nodes for each node in the pDFA nodes, and
   wherein identifying a node in the fDFA nodes comprises using the mapping to identify one of the fDFA nodes that corresponds to the current node in the pDFA.

5. The method of claim 1, wherein creating a set of nodes that represent a pDFA comprises:
   determining, when the current node of the pDFA nodes specifies a transition for the symbol to the failure node, whether a count of the pDFA nodes exceeds a size threshold; and
   identifying one of the fDFA nodes to which the current node of the fDFA node specifies a transition for the symbol; and
   creating a new one of the pDFA nodes that corresponds to this one of the fDFA nodes when the count of the pDFA nodes does not exceed the size threshold.

6. The method of claim 5, wherein creating a set of pDFA nodes further comprises:
   removing a second node from the set of pDFA nodes when the count of the pDFA nodes exceeds the size threshold and when the visitation level of the one of the pDFA nodes exceeds a visitation level of the second node; and
   updating the pDFA nodes such that each one of the pDFA nodes that specified a transition to the second node specifies a transition to the failure node of the pDFA in place of the transition to the second node.

7. The method of claim 1,
   wherein creating a set of pDFA nodes comprises creating a set of pDFA nodes that are formatted using a bitmap encoding scheme such that each of the pDFA nodes includes a fixed-length bitmap portion and a variable-length list of node indexes,
   wherein each of the node indexes indicates a memory location at which another one of the pDFA nodes is stored, and
   wherein the bitmap portion comprises a bits associated with different symbols.

8. The method of claim 7, wherein creating a set of pDFA nodes further comprises creating a set of pDFA nodes that are formatted using the bitmap encoding scheme such that when a one of the bits in the bitmap portion of one of the pDFA nodes is associated with a symbol and is set to a first value, the list of node indexes includes a node index associated with the symbol, and when the one of the bits is set to a second value, the list of node indexes does not include a node index associated with the symbol.

9. The method of claim 1, wherein storing the fDFA nodes comprises storing the fDFA nodes in a plurality of memory pages.

10. The method of claim 1, wherein the method further comprises identifying, when the current node of the pDFA nodes specifies a transition for the symbol to a node in the pDFA nodes, the node in the pDFA nodes as a new current node of the pDFA nodes.

11. The method of claim 10, wherein identifying the node in the pDFA nodes as a new current node of the pDFA nodes comprises increasing a visitation level of the new current node of the pDFA nodes and a one of the fDFA nodes that corresponds to the new current node of the pDFA nodes.

12. The method of claim 10, wherein determining whether the current node of the pDFA nodes specifies a transition for the symbol to the failure node comprises determining whether the symbol is a member of a class of symbols defined by a meta-symbol.

13. The method of claim 1,
wherein the set of fDFA nodes is a first set of fDFA nodes,
wherein the symbol pattern is a first symbol pattern,
wherein the method further comprises storing a second set of fDFA nodes that represent a second fDFA, wherein the second fDFA accepts symbol streams that conform to a second symbol pattern,
wherein creating a set of pDFA nodes comprises creating a set of pDFA nodes in which each the pDFA nodes corresponds to a node in the first set of fDFA nodes that has a visitation level that exceeds the visitation threshold and/or corresponds to a node in the second set of fDFA nodes that has a visitation level that exceeds the visitation level, and
wherein the method further comprises:
identifying, when the current node of the pDFA nodes specifies a transition for the symbol to the failure node, a node in the second set of fDFA nodes that corresponds to the current node of the pDFA nodes as a current node of the second set of fDFA nodes; and
accepting the symbol stream as conforming to the second symbol pattern when the current node of the pDFA nodes is the failure node and when the current node of the second fDFA nodes specifies a transition for the symbol to an accepting node.

14. The method of claim 1, wherein creating the set of pDFA nodes comprises:
creating a first set of temporary pDFA nodes, wherein each node in the first set of temporary pDFA nodes has a corresponding node in the first set of fDFA nodes that has a visitation level that exceeds a visitation threshold,
wherein each node in the first set of temporary pDFA nodes specifies a transition for a symbol to a node in the first set of temporary pDFA nodes when the corresponding node in the first set of fDFA nodes specifies a transition for the symbol to a node in the first set of fDFA nodes that has a visitation level that exceeds the visitation threshold, and wherein each node in the first set of temporary pDFA nodes specifies a transition for a symbol to a failure node in the first set of temporary pDFA nodes when the corresponding node in the first set of fDFA nodes specifies a transition for the symbol to a node in the first set of fDFA nodes that has a visitation level that does not exceed the visitation threshold;
creating a second set of temporary pDFA nodes, wherein each node in the second set of temporary pDFA nodes has a corresponding node in the second set of fDFA nodes that has a visitation level that exceeds a visitation threshold,
wherein each node in the second set of temporary pDFA nodes specifies a transition for a symbol to a node in the second set of temporary pDFA nodes when the corresponding node in the second set of fDFA nodes specifies a transition for the symbol to a node in the second set of fDFA nodes that has a visitation level that exceeds the visitation threshold, and
wherein each node in the second set of temporary pDFA nodes specifies a transition for a symbol to a failure node in the second set of temporary pDFA nodes when the corresponding node in the second set of fDFA nodes specifies a transition for the symbol to a node in the second set of fDFA nodes that has a visitation level that does not exceed the visitation threshold; and
merging the first set of temporary pDFA nodes and the second set of temporary pDFA nodes in order to create the set of pDFA nodes.

15. The method of claim 14, wherein merging the first set of temporary pDFA nodes and the second set of temporary pDFA nodes comprises:
creating a first new node that specifies each of the transitions specified in a node in the first set of temporary pDFA nodes and each of the transitions specified in a node in the second set of temporary pDFA nodes;
identifying a transition specified by the first new node to a node in the first set of temporary pDFA nodes for a symbol;
identifying a transition specified by the first new node to a node in the second set of temporary pDFA nodes for the same symbol;
recursively creating a second new node that a represents a merger of the node in the first set of temporary pDFA nodes and the node in the second set of temporary pDFA nodes; and
specifying a transition in the first new node to the second new node for the symbol.

16. An intermediate network device comprising:
a memory module that stores a set of full deterministic finite automaton (fDFA) nodes, wherein the fDFA nodes represent a full deterministic finite automaton (fDFA) that accepts strings of symbols that conform to a symbol pattern, the symbol pattern being associated with a computer security threat;
a pDFA update module that creates a set of pDFA nodes, wherein the pDFA nodes represent a partial deterministic finite automaton (pDFA),
wherein each of the pDFA nodes has a corresponding node in the fDFA nodes that has a visitation level that exceeds a visitation threshold,
wherein each node in the pDFA nodes specifies a transition for a symbol to a node in the pDFA nodes when the corresponding node in the fDFA nodes specifies a transition for the symbol to a node in the fDFA nodes that has a visitation level that exceeds the visitation threshold, and
wherein each node in the pDFA nodes specifies a transition for a symbol to a failure node in the pDFA nodes when the corresponding node in the fDFA nodes specifies a transition for the symbol to a node in the fDFA nodes that has a visitation level that does not exceed the visitation threshold; and
a DFA engine that receives a symbol in a symbol stream, determines whether a current node of the pDFA nodes is a failure node, determines, when the current node of the pDFA nodes is not the failure node, whether the current node of the pDFA nodes specifies a transition for the symbol to the failure node, when the current node of the pDFA nodes specifies a transition for the symbol to the failure node, accessing the set of fDFA nodes to identify a node in the fDFA nodes that corresponds to the current node of the pDFA nodes as a current node of the fDFA nodes, and detects a computer security threat when the current node of the pDFA nodes is the failure node and when the current node of the fDFA nodes specifies a transition for the symbol to an accepting node or when the current node of the pDFA nodes specifies a transition for the symbol to an accepting node.

17. The intermediate network device of claim 16, wherein the memory module stores the set of pDFA nodes within a single memory page.

18. The intermediate network device of claim 16, wherein the intermediate network device further comprises:
   a first network interface that receives network traffic from a first computer network;
   an application-layer module that extracts at least some of the symbol stream from the network traffic; and
   a second network interface that retransmits the network traffic on a second computer network when the symbol stream does not cause the pDFA or the fDFA to transition to an accepting node.

19. The intermediate network device of claim 16,
   wherein the DFA engine determines whether a count of the pDFA nodes exceeds a size threshold; and
   wherein the pDFA update module creates a node in the set pDFA nodes that corresponds to a node in the set of fDFA nodes when a count of the pDFA nodes does not exceed a size threshold and when the node in the set of fDFA nodes becomes the current node of the fDFA.

20. The intermediate network device of claim 19,
   wherein the pDFA update module removes a second node from the set of pDFA nodes when the count of the pDFA nodes exceeds the size threshold and when the visitation level of the one of the fDFA nodes exceeds a visitation level of the second node; and
   wherein the pDFA update module updates nodes in the set of pDFA nodes such that each one of the pDFA nodes that specified a transition to the second node specifies a transition to the failure node of the pDFA in place of the transition to the second node.

21. The intermediate network device of claim 16, wherein the memory module stores the fDFA nodes in a plurality of memory pages.

22. The intermediate network device of claim 16, wherein the DFA engine identifies, when the current node of the pDFA nodes specifies a transition for the symbol to a node in the pDFA nodes, the node in the pDFA nodes as a new current node of the pDFA nodes.

23. The intermediate network device of claim 22, wherein the DFA engine increases a visitation level of the new current node of the pDFA nodes and a one of the fDFA nodes that corresponds to the new current node of the pDFA nodes.

24. The intermediate network device of claim 16, wherein the DFA engine accepts the symbol stream as conforming to the symbol pattern when the current node of the pDFA nodes specifies a transition for the symbol to an accepting node.

25. The intermediate network device of claim 16,
   wherein the set of fDFA nodes is a first set of fDFA nodes,
   wherein the symbol pattern is a first symbol pattern,
   wherein the memory module stores a second set of fDFA nodes that represent a second fDFA, wherein the second fDFA accepts symbol streams that conform to a second symbol pattern,
   wherein each node in the pDFA corresponds to a node in the first set of fDFA nodes that has a visitation level that exceeds the visitation threshold and/or corresponds to a node in the second set of fDFA nodes that has a visitation level that exceeds the visitation level;
   wherein the DFA engine identifies, when the current node of the pDFA nodes specifies a transition for the symbol to the failure node, a node in the second set of fDFA nodes that corresponds to the current node of the pDFA nodes as a current node of the second set of fDFA nodes, and
   wherein the DFA engine accepts the symbol stream as conforming to the second symbol pattern when the current node of the pDFA nodes is the failure node and when the current node of the second fDFA nodes specifies a transition for the symbol to an accepting node.

26. The intermediate network device of claim 25,
   wherein the pDFA update module creates the set of pDFA nodes by creating a first set of temporary pDFA nodes, creating a second set of temporary pDFA nodes, and by merging the first set of temporary pDFA nodes and the second set of temporary pDFA nodes to create the set of pDFA nodes,
   wherein each node in the first set of temporary pDFA nodes has a corresponding node in the first set of fDFA nodes that has a visitation level that exceeds a visitation threshold,
   wherein each node in the first set of temporary pDFA nodes specifies a transition for a symbol to a node in the first set of temporary pDFA nodes when the corresponding node in the first set of fDFA nodes specifies a transition for the symbol to a node in the first set of fDFA nodes that has a visitation level that exceeds the visitation threshold,
   wherein each node in the first set of temporary pDFA nodes specifies a transition for a symbol to a failure node in the first set of temporary pDFA nodes when the corresponding node in the first set of fDFA nodes specifies a transition for the symbol to a node in the first set of fDFA nodes that has a visitation level that does not exceed the visitation threshold;
   wherein each node in the second set of temporary pDFA nodes has a corresponding node in the second set of fDFA nodes that has a visitation level that exceeds a visitation threshold,
   wherein each node in the second set of temporary pDFA nodes specifies a transition for a symbol to a node in the second set of temporary pDFA nodes when the corresponding node in the second set of fDFA nodes specifies a transition for the symbol to a node in the second set of fDFA nodes that has a visitation level that exceeds the visitation threshold, and
   wherein each node in the second set of temporary pDFA nodes specifies a transition for a symbol to a failure node in the second set of temporary pDFA nodes when the corresponding node in the second set of fDFA nodes specifies a transition for the symbol to a node in the second set of fDFA nodes that has a visitation level that does not exceed the visitation threshold.

27. A non-transitory computer-readable medium comprising instructions, when executed the instructions causing a processor to:
   store a set of full deterministic finite automaton (fDFA) nodes in a memory module, wherein the fDFA nodes represent a full deterministic finite automaton fDFA that accepts symbol streams that conform to a symbol pattern, the symbol pattern being associated with a computer security threat;

create a set of pDFA nodes, wherein the pDFA nodes represent a partial deterministic finite automaton (pDFA),
  wherein each of the pDFA nodes has a corresponding node in the fDFA nodes that has a visitation level that exceeds a visitation threshold, wherein each node in the pDFA nodes specifies a transition for a symbol to a node in the pDFA nodes when the corresponding node in the fDFA nodes specifies a transition for the symbol to a node in the fDFA nodes that has a visitation level that exceeds the visitation threshold, and wherein each node in the pDFA nodes specifies a transition for a symbol to a failure node in the pDFA nodes when the corresponding node in the fDFA nodes specifies a transition for the symbol to a node in the fDFA nodes that has a visitation level that does not exceed the visitation threshold;
receive a symbol in a symbol stream;
determine whether a current node of the pDFA nodes is a failure node;
determine, when the current node of the pDFA nodes is not the failure node, whether the current node of the pDFA nodes specifies a transition for the symbol to the failure node;
when the current node of the pDFA nodes specifies a transition for the symbol to the failure node, accessing the set of fDFA nodes to identify a node in the fDFA nodes that corresponds to the current node of the pDFA nodes as a current node of the fDFA nodes; and
detect a computer security threat when the current node of the pDFA nodes is the failure node and when the current node of the fDFA nodes specifies a transition for the symbol to an accepting node or when the current node of the pDFA nodes specifies a transition for the symbol to an accepting node.

28. The non-transitory computer-readable medium of claim 27,
  wherein the instructions that cause the processor to store a set of fDFA nodes comprise instructions that cause the processor to store the set of fDFA nodes in a plurality of memory pages; and
  wherein the instructions that cause the processor to create the set of pDFA nodes comprise instructions that cause the processor to store the set of pDFA nodes in a single memory page.

* * * * *

UNITED STATES PATENT AND TRADEMARK OFFICE
CERTIFICATE OF CORRECTION

| | |
|---|---|
| PATENT NO. | : 7,904,961 B2 |
| APPLICATION NO. | : 11/738059 |
| DATED | : March 8, 2011 |
| INVENTOR(S) | : Ma et al. |

It is certified that error appears in the above-identified patent and that said Letters Patent is hereby corrected as shown below:

Column 21, line 24 (claim 13), "which each the pDFA" should be -- which each of the pDFA --

Column 22, line 30 (claim 15), "that a represents a" should be -- that represents a --

Signed and Sealed this
Tenth Day of April, 2012

David J. Kappos
*Director of the United States Patent and Trademark Office*